(12) United States Patent
Orow et al.

(10) Patent No.: US 9,644,780 B2
(45) Date of Patent: May 9, 2017

(54) KINK RESISTANT HOSE SYSTEM WITH LAYER OF SPACED GEOMETRICAL UNITS AND METHOD OF MANUFACTURING

(71) Applicant: Fiskars Oyj Abp, Helsinki (FI)

(72) Inventors: Timothy J. Orow, Peoria, IL (US); Lawrence P. Heren, East Peoria, IL (US)

(73) Assignee: Fiskars Oyj Abp, Helsinki (FI)

( * ) Notice: Subject to any disclaimer, the term of this patent is extended or adjusted under 35 U.S.C. 154(b) by 0 days.

(21) Appl. No.: 14/202,005

(22) Filed: Mar. 10, 2014

(65) Prior Publication Data

US 2014/0261844 A1  Sep. 18, 2014

Related U.S. Application Data

(60) Provisional application No. 61/787,749, filed on Mar. 15, 2013.

(51) Int. Cl.
*F16L 11/00* (2006.01)
*F16L 57/02* (2006.01)
(Continued)

(52) U.S. Cl.
CPC ............ *F16L 57/02* (2013.01); *B29C 59/007* (2013.01); *B29C 59/165* (2013.01); *F16L 11/08* (2013.01);
(Continued)

(58) Field of Classification Search
USPC ................................. 138/119, 123, 137, 153
See application file for complete search history.

(56) References Cited

U.S. PATENT DOCUMENTS 2,597,975 A   5/1952   Colombo
3,387,069 A   6/1968   Stohr
(Continued)

FOREIGN PATENT DOCUMENTS

DE   168654 C   6/1905
DE   878847 C   6/1953
(Continued)

OTHER PUBLICATIONS

International Search Report and Written Opinion corresponding to PCT Application No. PCT/US2014/024984, mailed Jul. 24, 2014 (14 pages).
(Continued)

*Primary Examiner* — Vishal Pancholi
(74) *Attorney, Agent, or Firm* — Foley & Lardner LLP

(57) ABSTRACT

A fluid conduit includes a flexible member having a tubular wall and a plurality of geometric segments located adjacent to the tubular wall. The geometric segments are disposed about a central axis of the conduit and spaced apart relative to each other to define a gap therebetween. The gap is sized to be closed by contact between adjacent geometric segments upon a predetermined flexure of the flexible member. A method of forming the conduit includes forming a flexible member with a tubular wall and forming a plurality of grooves about the central axis in the tubular wall. The geometric segments in one embodiment are formed from the intersections of a first plurality of helical grooves formed at a first angle relative to the central axis and a second plurality of helical grooves formed at a second angle mutually opposite from the first angle.

17 Claims, 10 Drawing Sheets

(51) Int. Cl.
  *F16L 11/08*    (2006.01)
  *F16L 11/10*    (2006.01)
  *B29C 59/00*    (2006.01)
  *B29C 59/16*    (2006.01)
  B29D 23/00      (2006.01)
  B29C 63/02      (2006.01)
  B29C 35/08      (2006.01)

(52) U.S. Cl.
  CPC .............. *F16L 11/10* (2013.01); *B29C 63/02* (2013.01); *B29C 2035/0838* (2013.01); *B29C 2793/0054* (2013.01); *B29D 23/001* (2013.01); Y10T 29/49826 (2015.01)

(56)   References Cited

U.S. PATENT DOCUMENTS

| | | | |
|---|---|---|---|
| 4,355,664 A * | 10/1982 | Cook et al. | 138/110 |
| 4,553,568 A | 11/1985 | Piccoli et al. | |
| 4,620,569 A | 11/1986 | von Glanstatten et al. | |
| 5,174,340 A * | 12/1992 | Peterson et al. | 138/110 |
| 5,310,594 A | 5/1994 | Holland et al. | |
| 5,431,191 A * | 7/1995 | Neuhauser | F16L 11/127 138/103 |
| 5,437,311 A * | 8/1995 | Reynolds | F16L 11/04 138/115 |
| 5,542,454 A * | 8/1996 | Carlson | E21B 17/22 138/108 |
| 5,682,925 A | 11/1997 | Seckel | |
| 5,712,010 A * | 1/1998 | Russek et al. | 428/36.3 |
| 5,746,253 A * | 5/1998 | Dust | B29C 45/0046 138/137 |
| 5,824,382 A | 10/1998 | Ruby | |
| 5,865,216 A | 2/1999 | Youngs | |
| 6,227,252 B1 * | 5/2001 | Logan | 138/172 |
| 6,464,632 B1 | 10/2002 | Taylor | |
| 6,949,282 B2 * | 9/2005 | Obeshaw | 428/131 |
| 2004/0138644 A1 * | 7/2004 | DiCarlo et al. | 604/524 |
| 2004/0154676 A1 * | 8/2004 | Wilkinson | 138/125 |
| 2004/0256019 A1 * | 12/2004 | Marion | 138/137 |
| 2005/0126651 A1 * | 6/2005 | Sherwin | 138/127 |

FOREIGN PATENT DOCUMENTS

| | | |
|---|---|---|
| EP | 0 394 95 A2 | 11/1981 |
| FR | 1025709 A | 4/1953 |
| GB | 2 186 658 A | 8/1987 |
| WO | WO-2014/159744 A1 | 10/2014 |

OTHER PUBLICATIONS

International Preliminary Report on Patentability, PCT/US2014/024984, Orow, Timothy, 9 pages (Sep. 24, 2015).

English-language machine translation of FR 1025709, Brunswick (Apr. 20, 1953).

* cited by examiner

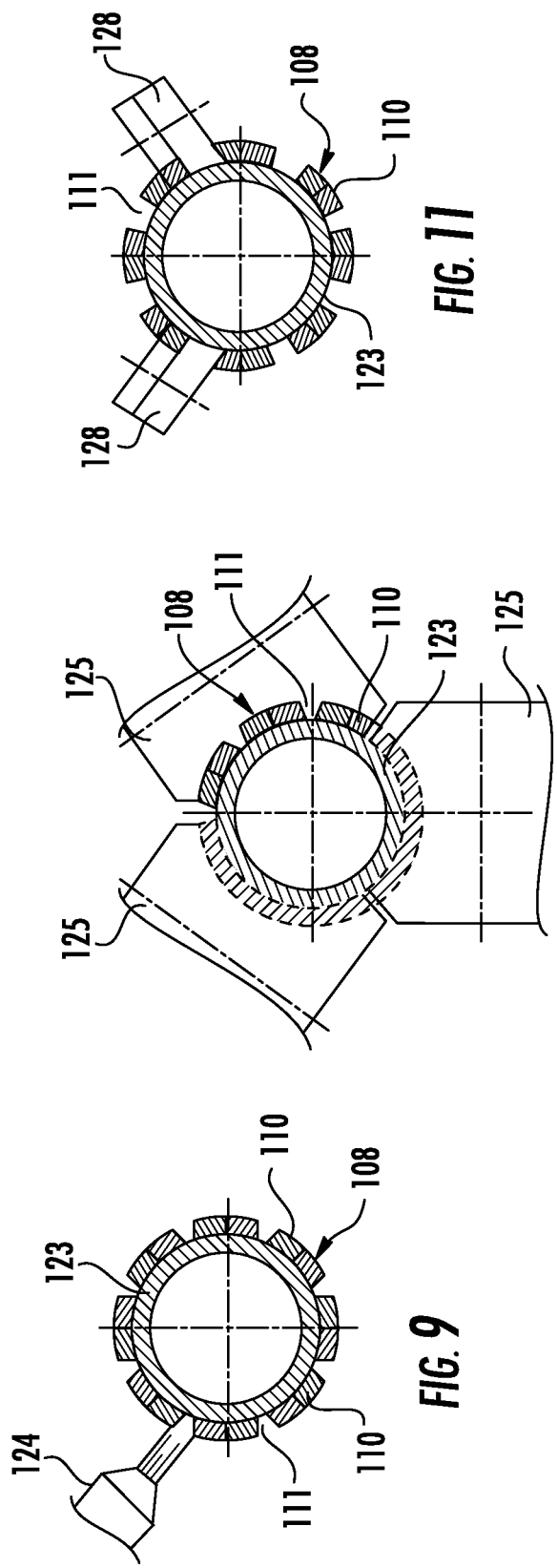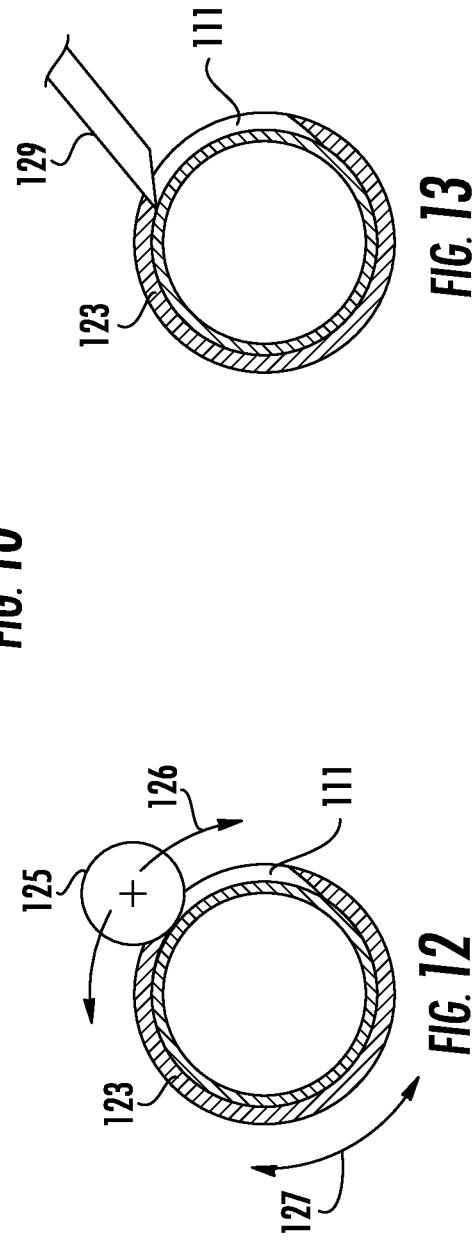

KINK RESISTANT HOSE SYSTEM WITH LAYER OF SPACED GEOMETRICAL UNITS AND METHOD OF MANUFACTURING

This application claims the benefit of U.S. Provisional Application No. 61/787,749, filed Mar. 15, 2013, the disclosure of which is incorporated herein by reference in its entirety.

FIELD OF THE INVENTION

The present disclosure relates to fluid conduits and, more particularly, to flexible hoses.

BACKGROUND

Flexible hoses are widely utilized in a wide variety of industrial, household, and commercial applications. One commercial application for hoses are garden or water hoses for household or industrial use. For instance, the hoses are used for watering grass, trees, shrubs, flowers, vegetable plants, vines, and other types of vegetation, cleaning houses, buildings, boats, equipment, vehicles, animals, or transfer between a fluid source and an appliance. For example, the appliance can be a wash stand, a faucet or the like for feeding cold or hot water. Another commercial application for hoses are automotive hose for fuel delivery, gasoline, and other petroleum-based products. Another application for hoses are vacuum cleaner hoses for household or commercial applications. For instance, the hoses are used with vacuum cleaners, power tools, or other devices for collecting debris or dispensing air. Fluids, such as beverages, fuels, liquid chemicals, fluid food products, gases and air are also frequently delivered from one location to another through a flexible hose.

Flexible hoses have been manufactured for decades out of polymeric materials such as natural rubbers, synthetic rubbers, thermoplastic elastomers, and plasticized thermoplastic materials. Conventional flexible hoses commonly have a layered construction that includes an inner tubular conduit, a spiraled, braided, or knitted reinforcement wrapped about the tubular conduit, and an outer cover.

Kinking and collapsing are problems that are often associated with flexible hoses. Kinking is a phenomenon that occurs, for example, when the hose is doubled over or twisted. A consequence of kinking is that the flow of fluid through the hose is either severely restricted or completely blocked. Kinking becomes a nuisance and causes a user undue burden to locate and relieve the kinked portion of the hose.

There have been previous attempts to make hoses more resistant to kink, crush, collapse, and/or burst by incorporating a spiral or helical reinforcement strip into the outer tubular layer of the hose. This construction, however, has often made these reinforced hoses unduly stiff because the embedded helix lacks the ability to flex freely. This construction in some cases has often required thicker and more rigid inner tubular layers. What is needed, therefore, is a reinforced fluid conduit in which the structural reinforcement is readily customizable to suit the different performance needs of its users.

SUMMARY

A fluid conduit in one embodiment includes a flexible member having a tubular wall configured to convey a fluid, the tubular wall defining a central axis extending through the flexible member, and a plurality of geometric segments disposed adjacent to the tubular wall, the geometric segments disposed circumferentially about and longitudinally along the central axis and spaced apart relative to each other to define a gap therebetween, the gap sized to be closed by contact between adjacent geometric segments upon a predetermined flexure of the flexible member.

A fluid conduit in another embodiment includes a flexible member having a tubular wall configured to convey a fluid, the tubular wall defining a central axis extending through the flexible member, and a plurality of geometric segments disposed adjacent to the tubular wall, the geometric segments defined by a first plurality of spaced helical grooves formed in the tubular wall at a first angle relative to the central axis and a second plurality of spaced helical grooves formed in the tubular wall at a second angle relative to the central axis, the first angle and the second angle being mutually opposite with respect to the central axis.

A method of forming a fluid conduit includes forming a flexible member with a tubular wall, the tubular wall defining a central axis extending through the flexible member, and forming a plurality of geometric segments adjacent to the tubular wall, the geometric segments disposed circumferentially about and longitudinally along the central axis and spaced apart relative to each other to define a gap therebetween, the gap sized to be closed by contact between adjacent geometric segments upon a predetermined flexure of the flexible member.

BRIEF DESCRIPTION OF THE DRAWINGS

FIGS. 9-13 are front plan views illustrating alternative methods to alter an intermediate layer of the conduit to form the geometric units of the structural layer;

DETAILED DESCRIPTION

Figure 1:
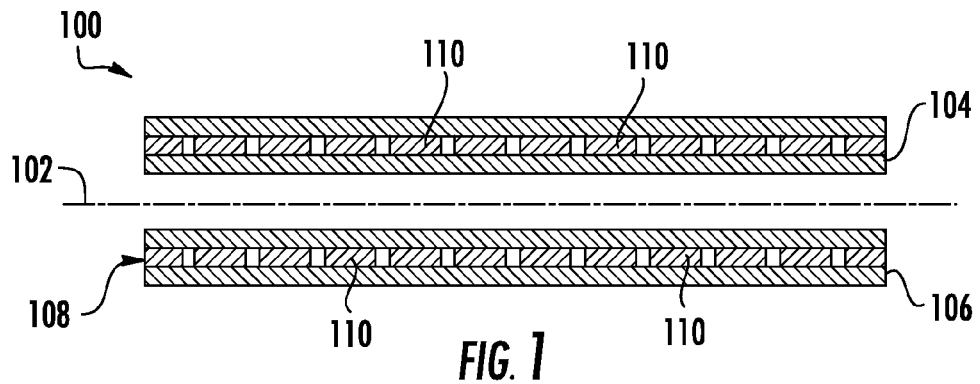
FIG. 1 is a section cut through a portion of a flexible fluid conduit having a structural layer formed in accordance with the present disclosure.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

FIG. 1 shows a straight portion of flexible fluid conduit 100 sectioned along its central axis 102. The conduit 100 includes an outer liner 106 and inner liner 104 that forms a flow path through the conduit 100. In the embodiment shown, the conduit 100 further includes a structural layer 108 positioned between the inner and outer liners 104, 106. The structural layer 108, as discussed in more detail below, is configured to prevent the restriction of fluid flow along the flow path due to bending or kinking of the conduit 100.

Figure 2:
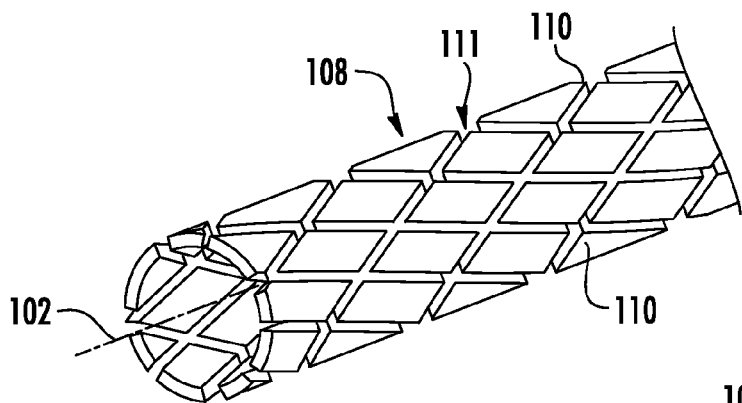
FIG. 2 is a perspective view of the structural layer of FIG. 1.
Figure 3:
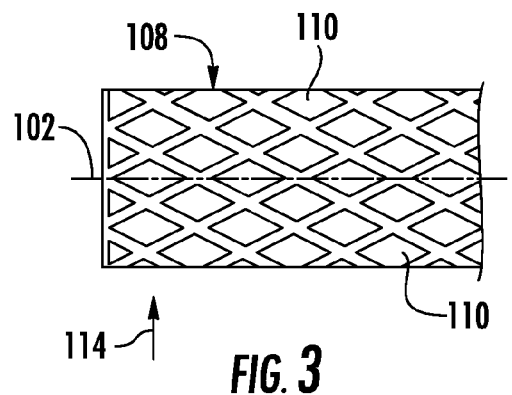
FIG. 3 is a side plan view of the structural layer of FIG. 1.

As best shown in FIGS. 2 and 3, the structural layer 108 is formed from a plurality of spaced geometric units 110 positioned circumferentially about the central axis 102. For purposes of this disclosure, the central axis 102 of the structural layer 108 and the central axis 102 of the conduit 100 are coincident, and any further reference to "central axis" refers to both axes. In the embodiment shown, each geometric unit 110 is formed in the shape of an elongated diamond and has a peripheral gap 111 formed between each adjacent geometric unit in the plurality of geometric units 110. In other embodiments, the gap 111 is vacuum or air filled. The consecutive gaps between the adjacent geometric units 110 of the structural layer 108 enable the structural layer 108 to flex and to extend and compress axially. As discussed in more detail below, it is the interaction between the spaced adjacent geometric units in the plurality of geometric units 110 that enables the structural layer 108 to reduce restrictions in the flow path when the conduit 100 is subjected to a collapsing or bending force.

The geometric units 110 are formed from any flexible, semi-flexible, or rigid material that enables practical reproduction of the geometric units 110 in an intended shape and size. Although the geometrics units 110 of FIGS. 2 and 3 are shown as elongated diamonds, other geometric shapes are possible. In some embodiments, for example, the geometric units are circular, square, or triangular. The size, number, and spacing of the geometric units 110 are also variable.

Figure 4:
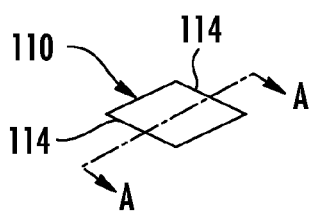
FIG. 4 is an auxiliary view of a one geometric unit of a plurality of geometric units forming the structural layer.
Figure 5:
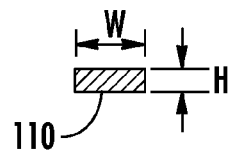
FIG. 5 is a section cut through the geometric unit of FIG. 4 along line A-A.

FIG. 4 depicts an auxiliary view of one geometric unit of the plurality of geometric units 110 when the structural layer 108 is viewed from the arrow 113 of FIG. 3. FIG. 5 shows a cross section of the geometric unit 110 of FIG. 4 taken along line A-A with the section line oriented perpendicular to a pair of parallel side edges 114 of the one geometric unit 110. In the embodiment shown, the geometric unit 110 has a rectangular cross section with a constant width W and a constant height H. In other embodiments, however, the width W and the height H of the cross section can vary across the plurality of geometric units 110.

Figure 8:
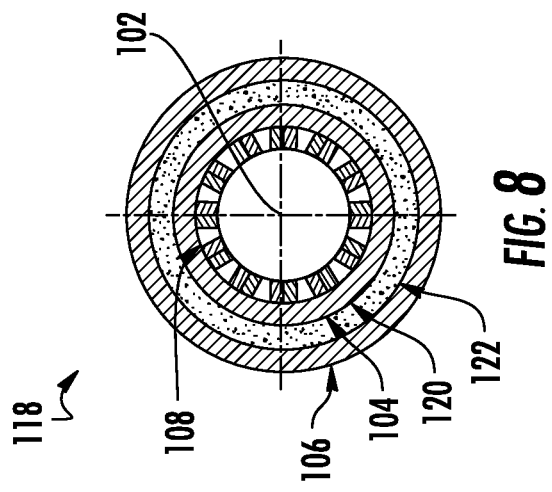
FIGS. 6-8 are section cuts through three embodiments of a conduit having the structural layer of FIG. 1 positioned differently in each embodiment.
Figure 7:
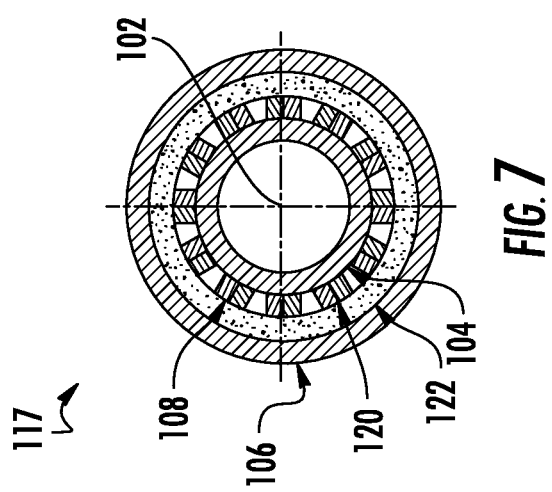
Figure 6:
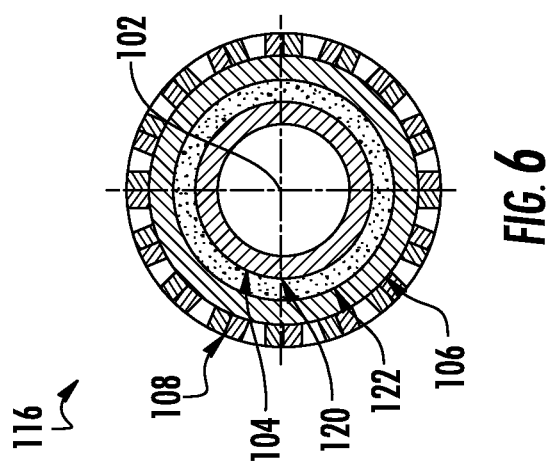

FIGS. 6-8 show three embodiments 116, 117, 118 of a conduit with the structural layer 108 at a different position on the conduit in each embodiment. The conduit of each of the embodiments includes an inner liner 104, a woven sleeve 120, a foamed liner 122, and an outer liner 106 each radially positioned from inside to outside about the central axis 102. In the embodiments shown, the woven sleeve 120 is depicted as a one-dimensional line between adjacent conduit layers. The structural layer 108 in each embodiment is at a different position within the conduit. For example, FIG. 6 shows the structural layer 108 positioned on the exterior of the conduit 116 adjacent to the outer liner 106. FIG. 7 shows the structural layer 108 of the conduit 117 positioned between the inner liner 104 and the woven sleeve 120. FIG. 8 shows the structural layer 108 positioned within the interior of the conduit 118 adjacent to the flow path on the inside and the inner liner 104 on the outside. The embodiments of FIGS. 6-8 show the conduit as comprising five layers with the structural layer 108 positioned at three different locations within these layers. In other embodiments, the conduit can include lesser or greater numbers of layers with the structural layer 108 positioned between any of the provided layers.

The structural layer 108 in some embodiments is free to move or float rotationally around and/or axially along the central axis 102 of the conduit regardless of its position within the conduit. In other embodiments, the structural layer 108 is bonded to one or more adjacent layers of the conduit to restrict its relative movement about or along the central axis 102. The bonding of the structural layer 108 in these embodiments can be accomplished by any practical method. In one embodiment, an adhesive is used to secure the structural layer 108 to one or more of the adjacent conduit layers. In some embodiments in which movement of the structural layer 108 is at least partially restricted, the structural layer 108 and at least one adjacent layer are integrated into a single layer. The integration of the structural layer 108 and the at least one adjacent layer can be accomplished as part of an extrusion process that forms the adjacent layer or by altering the adjacent layer after the extrusion process.

FIGS. 9-13 schematically illustrate methods to alter the adjacent layer 123 for integration with or formation of the structural layer 108. FIG. 9, for example, depicts the use of a tool 124, such as a laser, to thermally remove portions of the adjacent layer 123 to form each of the geometric units 110 of the structural layer 108. In other embodiments, the use of the laser 124 can modify a portion of the material from the adjacent layer 123 to release the structural layer 108. In some embodiments, the tool 124 forms the geometric units 110 by a non-thermal, non-contact method. The tool 124 in these embodiments directs an effect such as a frequency pulse, air wave, ripple effects or the like at the adjacent layer 123 to form each of the geometric units 110 of the structural layer 108.

FIG. 10 shows the use of a tool 125, such as one or more rollers, to form the geometric units 110 on the adjacent layer 123. In this embodiment, the rollers 125 form the geometric units 110 on the adjacent layer 123 while the adjacent layer 123 is still soft. In some embodiments, such as the embodiment of FIG. 12, the tool 125 is a rolling tool used on the adjacent layer 123 to relieve or remove material from the adjacent layer 123, depending on the application, to create the geometric units 110. The tool 125 in some embodiments is rotated about the adjacent layer 123 in the direction of arrow 126 to form the geometric units 110. In other embodiments, a plurality of tools rotate about the adjacent layer 123 in opposite directions to form the geometric units 110. In other embodiments, the rolling tool 125 is fixed and the adjacent layer 123 is rotated in the direction of arrow 127 to form each of the geometric units 110 of the structural layer 108.

FIG. 11 depicts the use of one or more cutters 128 to remove material from the adjacent layer 123 after the extrusion process. In one embodiment implementing the cutters 128, the cutters 128 are circular cutters. In some embodiments, such as the embodiment shown in FIG. 13, a fixed cutting tool 129 is used and the adjacent layer 123 is rotated about the fixed cutting tool 129 to form the geometric units 110. The tool can be, for example, a rotating padding tool, a blade or scribing tool (FIG. 13), or the like, or any combination thereof.

In each of the methods depicted in FIGS. 9-13, the adjacent layer 123 is extruded to a thickness that allows approximately half of the thickness of the adjacent layer 123 to be compressed or removed to form the geometric units 110 of the structural layer 108. In some of these embodiments, less than approximately half of the thickness of the adjacent layer is compressed or removed to form the geometric units 110.

Figure 16:
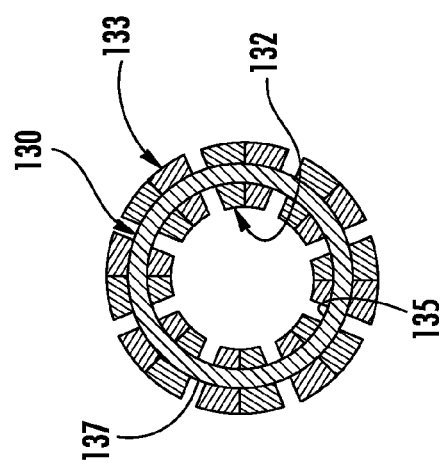
FIG. 16 is a front plan view showing two of the mesh liners of FIG. 12 positioned on respective inner and outer surfaces of the intermediate layer to form the structural layer.
Figure 15:
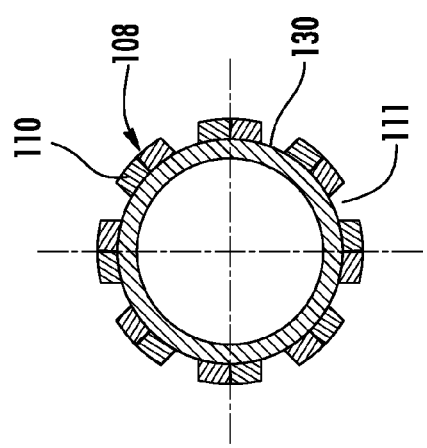
FIG. 15 is a front plan view showing the structural layer formed by positioning the geometric units on the conduit.
Figure 14:
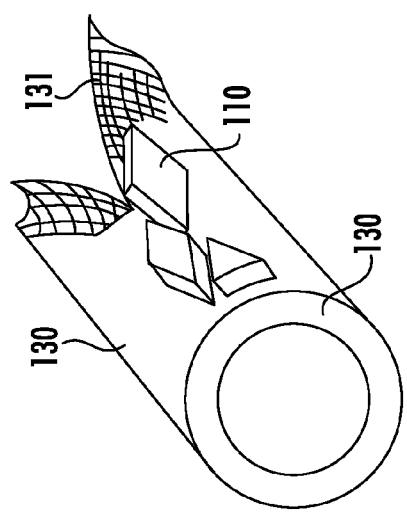
FIG. 14 is a perspective view showing the structural layer formed by positioning the geometric units on a mesh liner.

FIGS. 14-16 schematically depict methods to form the structural layer 108 of the conduit by positioning the geometric units 110 on the adjacent layer 130. FIG. 14, for example, shows the geometrics units 110 attached to a mesh strip 131. In this embodiment, the mesh strip 131 is wrapped around and bonded to the adjacent layer 130 to form the structural layer 108. FIG. 15 shows the geometric units 110 bonded directly to the adjacent layer 130 without the use of a substrate, such as the mesh strip 131 of FIG. 14. FIG. 16 shows the adjacent layer 130 with a first plurality of geometric units 132 attached to a first mesh and a second plurality of geometric units 133 attached to a second mesh. In this embodiment, the first mesh is bonded to an inner surface 135 of the adjacent layer 130 and the second mesh is bonded to an outer surface 137 of the adjacent layer 130 to form multiple structural layers.

Figure 17:
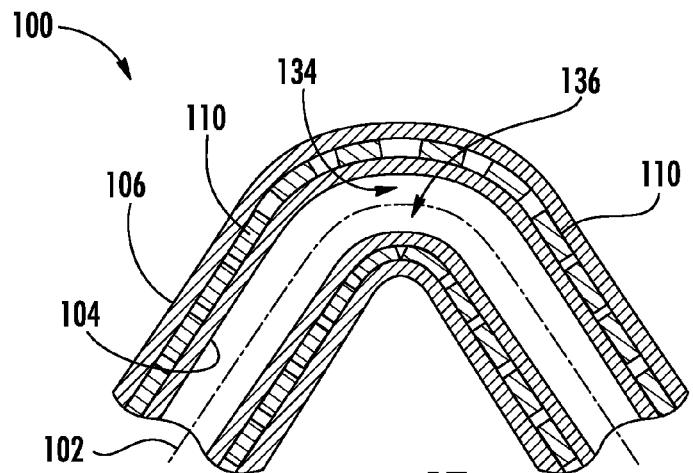
FIGS. 17-21 are section cuts through the conduit of FIG. 1 depicting the interaction between adjacent geometric units of the structural layer when the conduit is bent.

FIGS. 17-21 schematically depict the interaction between adjacent geometric units 110 of the structural layer 108 when the conduit 100 of FIG. 1 is bent. FIG. 17 shows the conduit 100 of FIG. 1 having a downward bend along its central axis 102. In the embodiment of FIG. 17, the downward bend of the conduit 100 produces an outer bend 134 along the conduit 100 above the central axis 102 and an inner bend 136 along the conduit 100 below the central axis 102.

For purposes of this disclosure, the relative directions "down", "downward", or "downwardly" refer to a direction pointing toward the bottom of the drawing sheet and the relative directions "up", "upward", or "upwardly" refer to a direction pointing toward the top of the drawing sheet. Similarly, the terms "bottom" or "below" refer to relative positions closer to the bottom of the drawing sheet and the terms "top" or "above" refer to relative positions closer to the top of the drawing sheet.

The following subscripts are used in conjunction with the letter X to denote the various geometric unit-to-geometric unit gap distances shown in the figures: (s)=straight conduit, (d)=downward bent conduit, (o)=outer bend position, (i)=inner bend position, (t)=tip gap between adjacent geometric units, and (b)=base gap between adjacent geometric units. For example, the gap distance $X_{dot}$ refers to the gap measured on a downward bent conduit (the subscript "d") at the outer bend position (the subscript "o") at the tip of the geometric units (the subscript "t").

Figure 18:
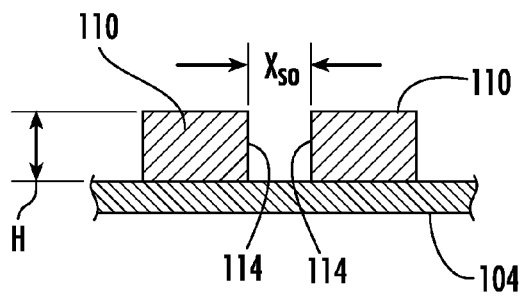
Figure 19:
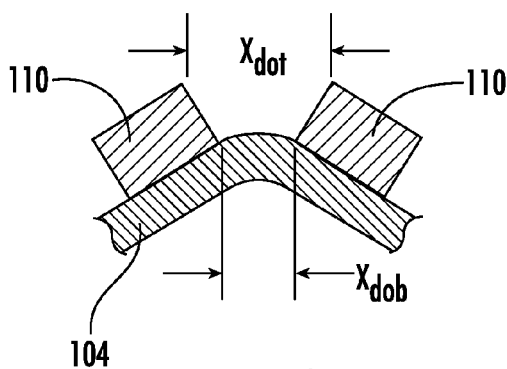

FIG. 18 shows two adjacent geometric units 110 positioned above the inner liner 104 at the approximate position of the outer bend 134 before the conduit 100 is bent. In the straight conduit of FIG. 18, the side edges 114 of the adjacent geometric units 110 are parallel with respect to each other. Accordingly, the gap between the geometric units 110 at the base of the geometric units 110 or the base gap $X_{sob}$ and the gap between the geometric units 110 at the tip of the geometric units 110 or the tip gap $X_{sot}$ are equal. In other words, the base gap $X_{sob}$ and the tip gap $X_{sot}$ can be collectively referred to as the straight gap $X_{so}$ of the straight conduit at the position of the outer bend 134. When the conduit 100 is bent downward at the outer bend 134 as depicted in FIGS. 17 and 19, the base gap of the bent conduit $X_{dob}$ is approximately equal to or greater than the straight gap of the straight conduit $X_{so}$. The tip gap of the bent conduit $X_{dot}$, however, is typically greater than the straight gap of the straight conduit $X_{so}$ since the adjacent geometric units 110 rotate away from each other as the inner liner 104 bends downward.

Figure 20:
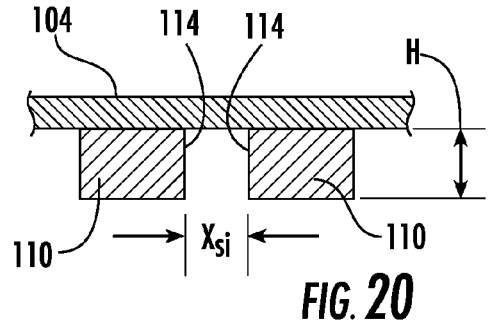

FIG. 20 shows two adjacent geometric units 110 positioned below the inner liner 104 at the approximate position of the inner bend 136 before the conduit 100 is bent. In the straight conduit of FIG. 20, the side edges 114 of the adjacent geometric units 110 are parallel with respect to each other. Accordingly, the gap between the geometric units 110 at the base of the geometric units 110 $X_{sib}$ and the gap between the geometric units 110 at the tip of the geometric units $X_{sit}$ are equal. In other words, the base gap $X_{sib}$ and the tip gap $X_{sit}$ can be collectively referred to as the straight gap $X_{si}$ of the straight conduit at the position of the inner bend 136.

Figure 21:
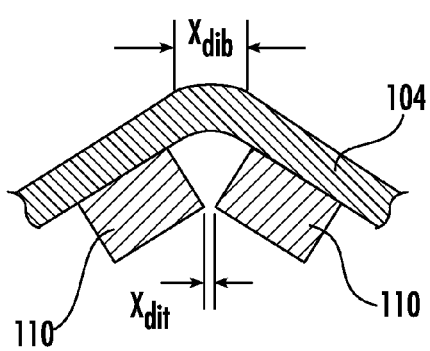

When the conduit 100 is bent downward at the inner bend 136 as depicted in FIGS. 17 and 21, the base gap of the bent conduit $X_{dib}$ is approximately equal to or less than the straight gap of the straight conduit $X_{si}$. The tip gap of the bent conduit $X_{dit}$, however, can range from slightly less than the straight gap of the straight conduit $X_{si}$ to zero. In other words, after a predefined amount of bending, the tips of the geometric units 110 at the inner bend 136 contact each other and provide a positive stop to prevent further bending of the conduit 100 at positions adjacent to the contacting geometric units 110. The geometric unit-to-geometric unit contact between each of the adjacent geometric units in the plurality of geometric units 110 prevents the conduit 100 from collapsing into the flow path and substantially restricting the fluid flow therethrough.

Figure 22:
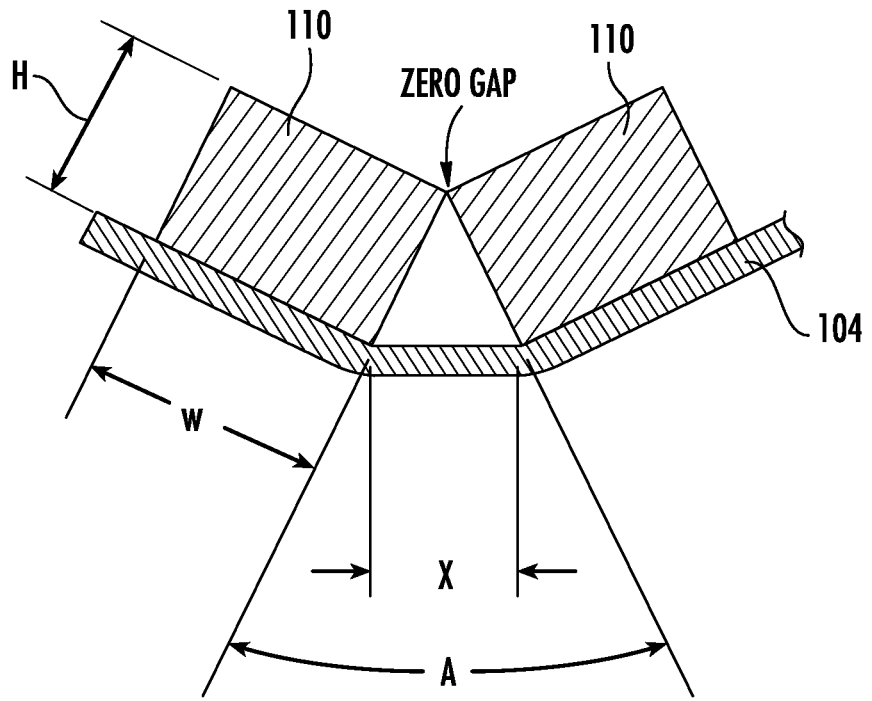
FIGS. 22-26 are section cuts through the conduit of FIG. 1 illustrating how dimensional changes to the features of the structural layer impact the flexibility of the conduit when the conduit of is bent.

FIG. 22 shows two adjacent geometric units 110 positioned above the inner liner 104 at an inner bend 136 of the conduit 100 after the conduit 100 of FIG. 1 has been bent upwardly (not shown). The adjacent geometric units 110 have a height H, a width W, a base gap X, and form a contact angle A having its vertex at the contact point of the geometric units 110. The maximum contact angle A formed between each of the adjacent geometric units in the plurality of geometric units 110 is one of a number of factors that determines the relative amount of bend of the conduit 100 over its length.

Figure 23:
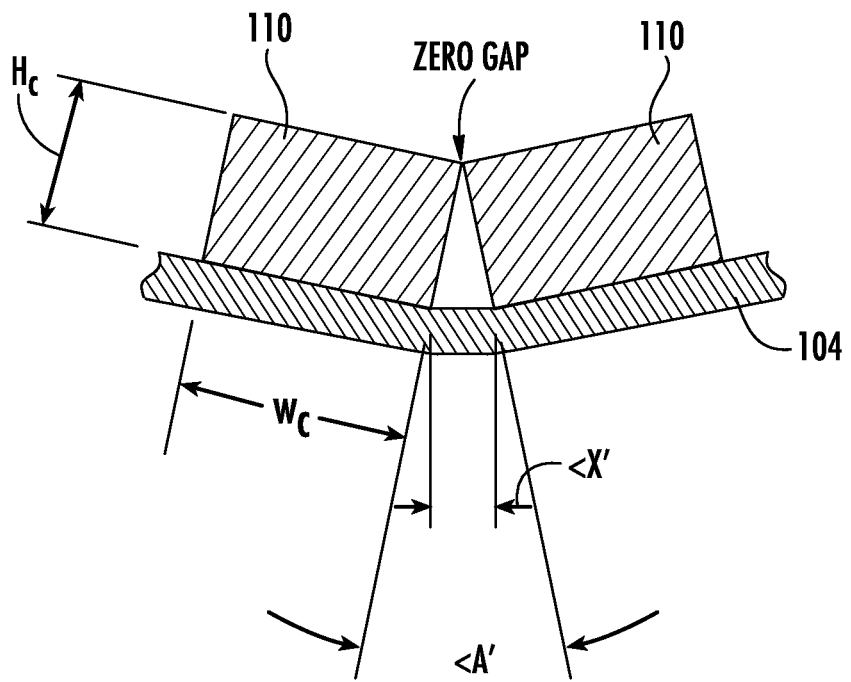

As shown by comparing FIGS. 22 and 23, reducing the base gap between the adjacent geometric units 110 from X to X' while holding constant the height $H_c$ and the width $W_c$ of the geometric units 110 reduces the contact angle from A to A' and, therefore, reduces the overall amount of bend in the conduit 100. The contact angle A' is reduced because the reduction in the base gap between the adjacent geometric units 110 moves the effective pivot points of the geometric units 110 closer together as the conduit 100 bends in the upward direction. Accordingly, the geometric units 110 rotate less before the tips of the geometric units 110 contact each other. If the base gap X between the adjacent geometric units 110 of FIG. 23 is increased, the contact angle A similarly increases, allowing more overall bend in the conduit 100 before the tips of the geometric units 110 contact each other.

Figure 24:
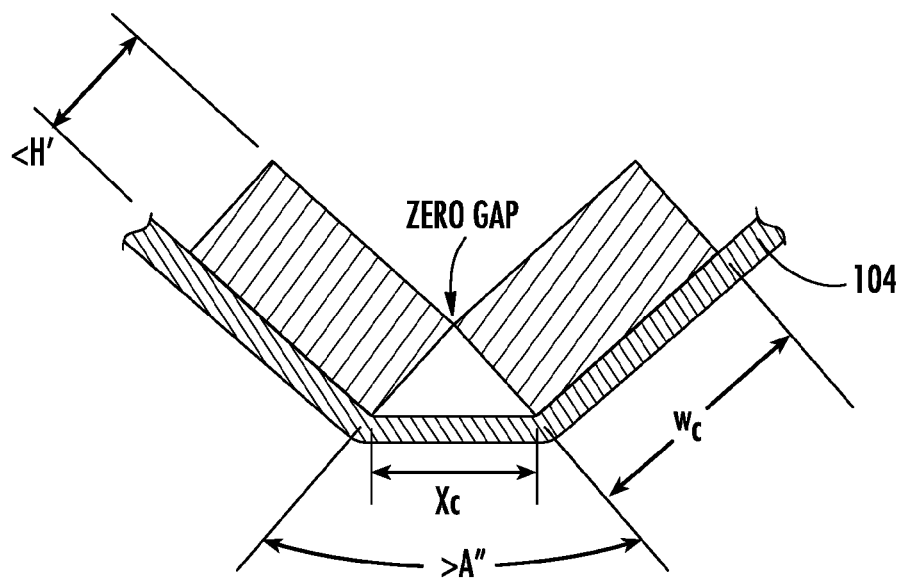

As shown by comparing FIG. 22 and FIG. 24, reducing the height of the adjacent geometric units 110 from H to H' while holding constant the base gap $X_c$ between the geometric units 110 and the width $W_c$ of the geometric units 110 increases the contact angle from A to A" and, therefore, increases the overall amount of bend in the conduit 100. The contact angle A" is increased because the reduction in the height of the adjacent geometric units 110 allows the geometric units 110 to rotate further about their effective pivot points before the tips of the geometric units 110 contact each other. If the height H of the adjacent geometric units 110 of FIG. 24 is increased, the contact angle A decreases, allowing less overall bend in the conduit 100 before the tips of the geometric units 110 contact each other.

Figure 25:
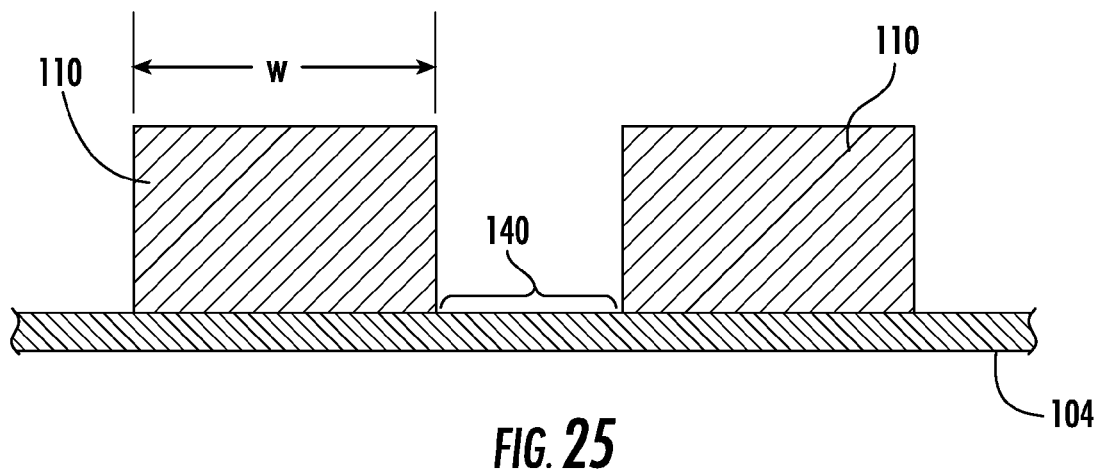
Figure 26:
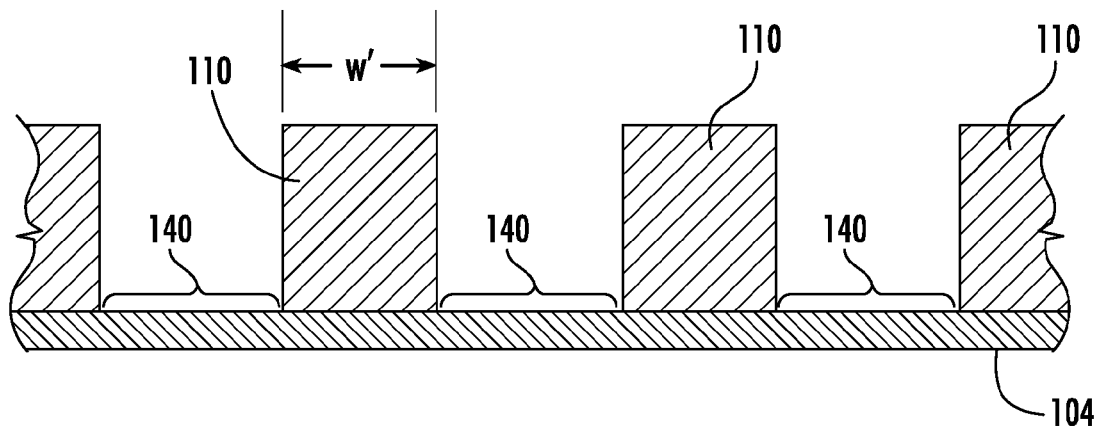

As explained with reference to FIGS. 25 and 26, reducing the width of each of the geometric units 110 from W (FIG. 25) to W' (FIG. 26) while holding constant the base gap $X_c$ between the geometric units 110 and the height $H_c$ of the geometric units 110 results in more flex regions 140 between the geometric units 110 for the same overall length of conduit 100. Increasing the number of flex regions along the length of the conduit increases the overall flexibility of the conduit because the cumulative length of the conduit capable of flexing increases with each added flex region 140.

Figure 27:
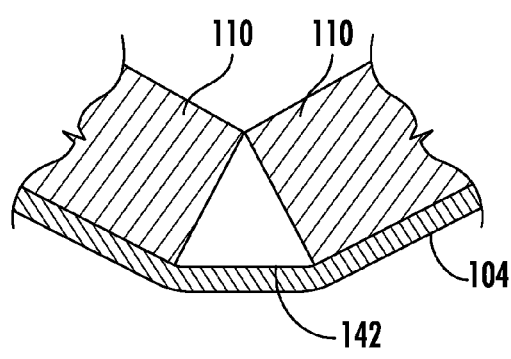
FIGS. 27-29 are section cuts through the conduit of FIG. 1 illustrating how the flexibility and compressibility of the intermediate layers and the geometric units of the structural layer effect the flexibility of the conduit.
Figure 28:
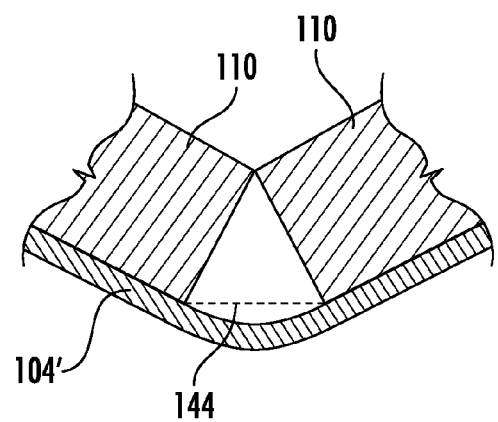

As shown in FIGS. 27 and 28, a reduction in the flexibility of the liner 104 can reduce the overall flexibility of the conduit 100. In a straight conduit, the base gaps between the geometric units 110 in each of FIGS. 27 and 28 are equal. The highly flexible inner liner 104 of FIG. 27 allows the maximum distance between the effective pivot points of the geometric units 110 in the bent conduit. In contrast, the more rigid inner liner 104' of FIG. 28 reduces the distance between the effective pivot points in the geometric units 110 in the bent conduit. In particular, a line 142 connecting the effective pivot points of the geometric units 110 of FIG. 27 falls along the path of the inner liner 104, indicating that the line 142 represents the maximum distance between the effective pivots points. In contrast, a line 144 connecting the effective pivot points of the geometric units 110 of FIG. 28 does not fall along the path of the inner liner 104' due to the reduced flexibility of the inner liner 104'.

Figure 29:
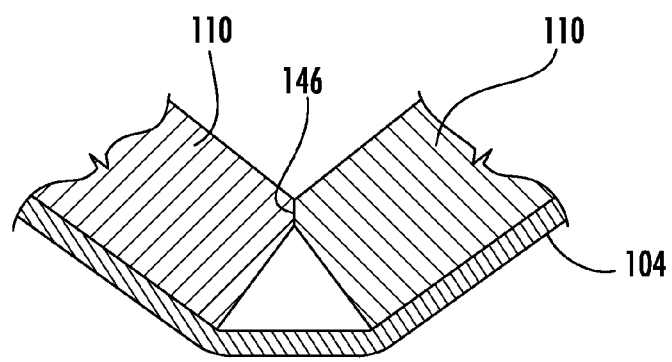

FIG. 29 illustrates the effect that the compressibility of the geometric unit material has on the contact angle between the adjacent geometric units 110. In the embodiment shown, the material at the contact point 146 between the two adjacent geometric units 110 is slightly deformed due to the compression of the material. For purposes of this disclosure, the term "non-deformed contact angle" refers to the angle formed when adjacent geometric units first make contact at the contact angle 146, but before either of the geometric units begins to deform. The term "fully-deformed contact angle" refers to the angle formed after adjacent geometric units have made contact at the contact point 146 and after both of the geometric units are fully deformed. As the geometric units 110 become more compressible, especially at their tip, the difference between the non-deformed contact angle and the fully-deformed contact angle increases between the adjacent geometric units 110, resulting in more overall flexibility in the conduit. The converse is also true. That is, as the geometric units 110 become less compressible, the difference between the non-deformed contact angle and the fully-deformed contact angle decreases between the adjacent geometric units 110, resulting in reduced overall flexibility in the conduit.

Figure 30:
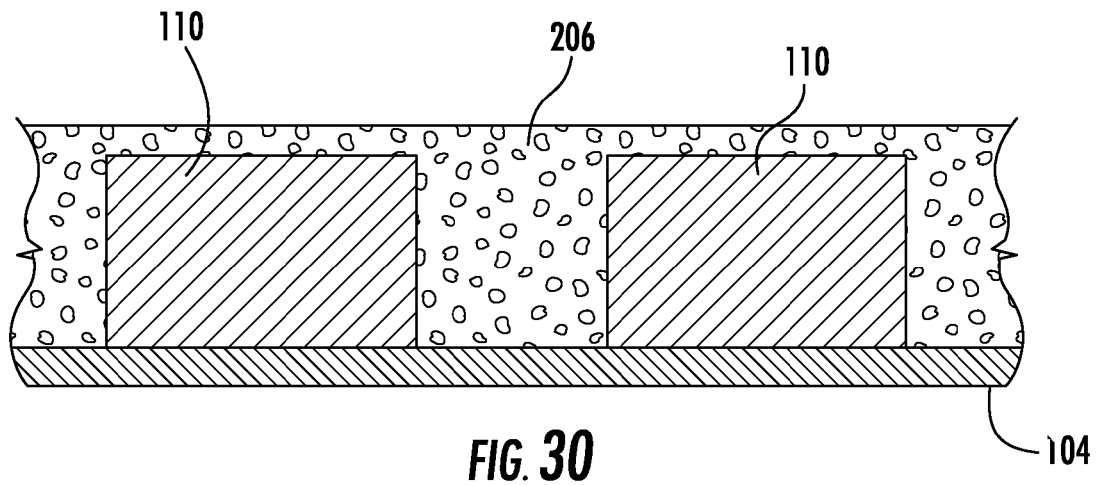
FIGS. 30-31 are section cuts through a portion of the conduit having a portion of an intermediate layer embedded between the geometric units of the structural layer.
Figure 31:
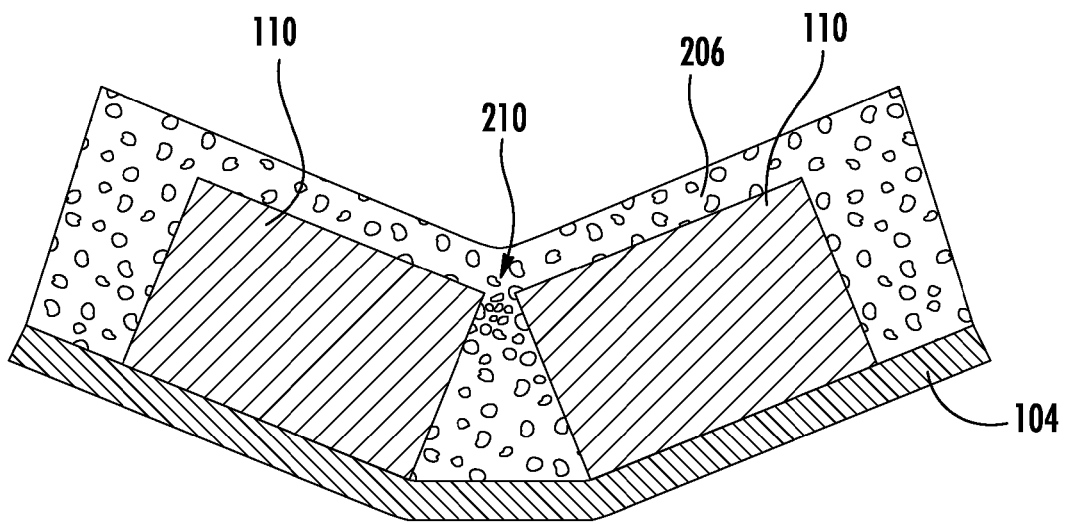

FIGS. 30 and 31 illustrate the effect that integration of the structural layer 108 with another layer has on the flexibility of the conduit 100. FIG. 30 depicts two adjacent geometric units 110 in a straight section of the conduit 100. The geometric units 110 are adjacent to the inner liner 104 and integrated with the outer liner 206. The gap between the adjacent geometric units 110 is occupied by the material of the outer liner 206. FIG. 31 shows the two adjacent geometric units 110 after the conduit 100 of FIG. 30 has been upwardly bent. In this embodiment, as the geometric units 110 come together due to the bending of the conduit 100, the portion 210 of the outer liner 206 between the geometric units 110 is compressed. The density of the outer liner material, therefore, determines how close the geometric units 110 can get to each other. Bending of the conduit 100 in the opposite direction causes the outer liner material to stretch between the geometric units 110.

Figure 32:
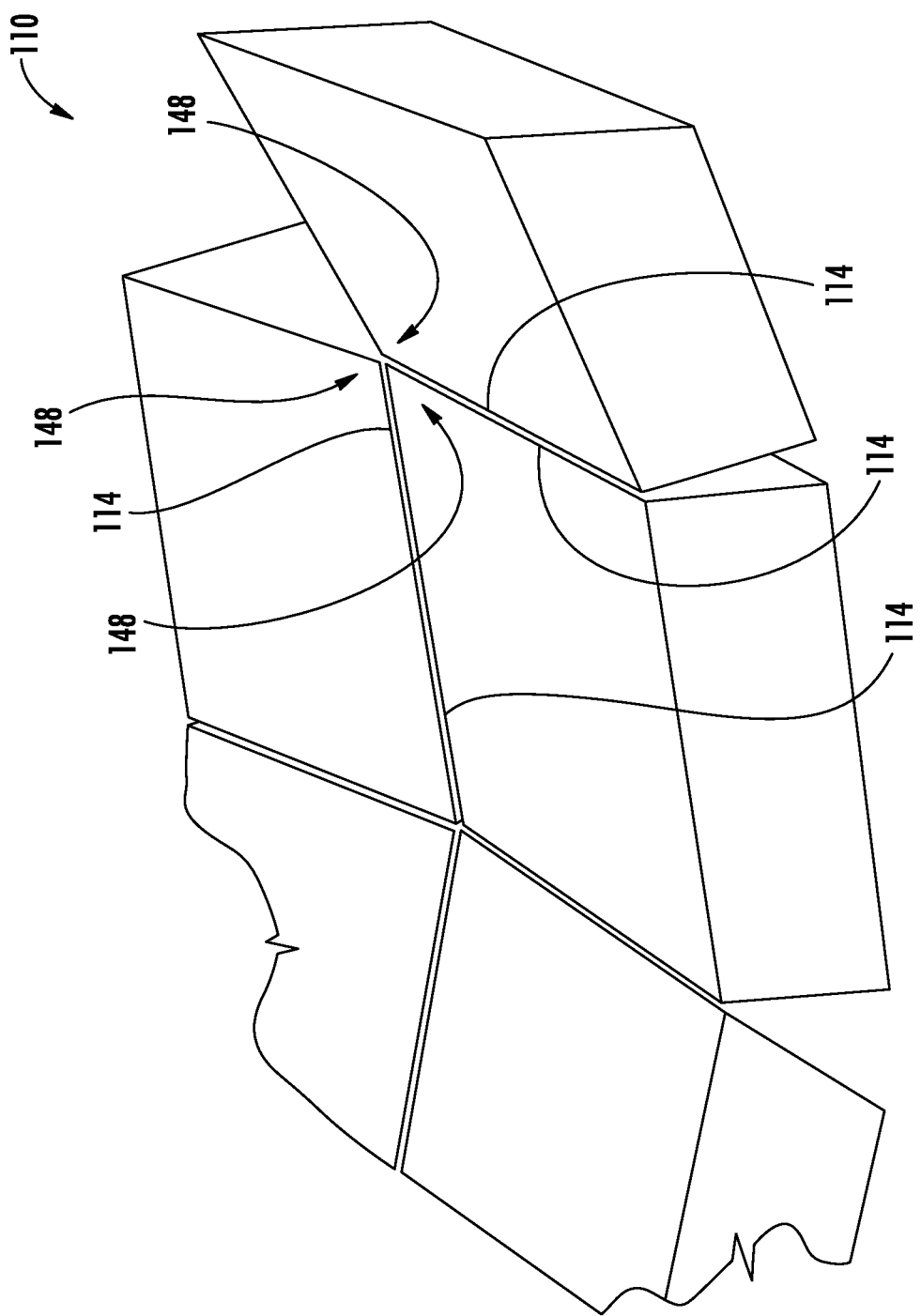
FIG. 32 is a perspective view of a portion of the structural layer of FIG. 1 showing the interaction of the geometric units after the conduit is bent.

FIG. 32 shows the interaction among five geometric units 110 of the structural layer 108 when the conduit 100 of FIG. 1 is bent. Although each of the geometric units 110 is shown interacting with adjacent geometric units substantially along its side edges 114, the interaction among the geometric units 110 can also occur as point contacts. For example, the adjacent geometric units 110 in some embodiments can make point contact at or near respective perimeter vertexes 148 instead of edge contact along the side edges 114. In some embodiments, the adjacent geometric units 110 can interact as a combination of point contact at the perimeter vertexes 148 and edge contact along the side edges 114. Various factors can effect whether or not adjacent geometric units 110 interact as point contact or edge contact. For example, in some embodiments, the relative amount of twist along different portions of the conduit 100 effects the type of contact between the adjacent geometric units 110 at each different portion of the conduit 100.

The geometric reinforced fluid conduit of the present disclosure is suitable for automotive, household, commercial, aerospace, medical, and industrial uses. The plurality of geometrical reinforcement members enable the structural layer to flex and to extend and compress axially.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:
1. A fluid hose, comprising:
a flexible member having a tubular wall configured to convey a fluid, the tubular wall defining a central axis extending through the flexible member;
a plurality of geometric segments disposed adjacent to the tubular wall, the geometric segments disposed circumferentially about and longitudinally along the central axis and spaced apart relative to each other to define a gap therebetween, the gap formed by (i) a first plurality of spaced grooves formed in the tubular wall and (ii) a second plurality of spaced grooves formed in the tubular wall, the gap separates the plurality of adjacent geometric segments, and the gap extending both longitudinally and circumferentially around the central axis, and sized to be closed by contact between adjacent geometric segments upon a predetermined flexure of the flexible member; and an outer layer, wherein a portion of the outer layer is located in the gap between adjacent geometric segments.

2. The fluid hose of claim 1, wherein geometric segments are bonded to the tubular wall.

3. The fluid hose of claim 1, wherein the geometric segments are integrally formed on the tubular wall, the geometric segments being defined by a plurality of grooves formed about the central axis in a portion of the tubular wall.

4. The fluid hose of claim 3, wherein each of the geometric segments has a base portion located adjacent to the tubular wall and a tip portion spaced radially from the tubular wall, and wherein the flexure of the flexible member is limited by contact between the tip portions of the adjacent geometric segments.

5. The fluid hose of claim 4, wherein the flexure of the flexible member is adjustable by varying one or more of:
   a radial thickness of the geometric segments as measured from the base portion to the tip portion; and
   a gap width between the geometric segments as measured between the respective base portions of the geometric segments.

6. The fluid hose of claim 4, wherein the flexible member is formed from a compressible material, and wherein the flexure of the flexible member is adjustable by varying the compressibility of the material at the tip portions of the geometric segments.

7. The fluid hose of claim 1, wherein each of the geometric segments has a diamond-shaped geometry.

8. A fluid hose, comprising:
   a flexible member having a tubular wall configured to convey a fluid, the tubular wall defining a central axis extending through the flexible member;
   a plurality of geometric segments disposed adjacent to the tubular wall, the geometric segments defined by (i) a first plurality of spaced helical grooves formed in the tubular wall at a first angle relative to the central axis and (ii) a second plurality of spaced helical grooves formed in the tubular wall at a second angle relative to the central axis, the first angle and the second angle being mutually opposite with respect to the central axis;
   wherein the first helical grooves and the second helical grooves define a gap between adjacent geometric segments, the gap sized to be closed by contact between the adjacent geometric segments upon a predetermined flexure of the flexible member; and
   an outer layer, wherein a portion of the outer layer is located in the gap between adjacent geometric segments.

9. The fluid hose of claim 8, wherein:
the first helical grooves have a first spacing therebetween,
the second helical grooves have a second spacing therebetween, and
the first spacing and the second spacing are equal such that a geometry of the geometric segments formed by the first and the second helical grooves is substantially similar.

10. The fluid hose of claim 9, wherein:
the first spacing varies between adjacent grooves of the first helical grooves,
the second spacing varies between adjacent grooves of the second helical grooves, and
the geometry of the geometric segments formed by the first and the second helical grooves is different.

11. The fluid hose of claim 1, wherein the portion of the outer layer in the gap between adjacent geometric segments is compressed when the flexible member is bent so that the adjacent geometric segments come together.

12. The fluid hose of claim 1, wherein the portion of the outer layer in the gap between adjacent geometric segments is stretched when the flexible member is bent so that the adjacent geometric segments move apart.

13. The fluid hose of claim 1, wherein the density of the outer layer is different than the density of the geometric segments.

14. The fluid hose of claim 13, wherein the density of the outer layer is less than the density of the geometric segments.

15. The fluid hose of claim 8, wherein the portion of the outer layer in the gap between adjacent geometric segments is compressed when the flexible member is bent so that the adjacent geometric segments come together.

16. The fluid hose of claim 8, wherein the density of the outer layer is different than the density of the geometric segments.

17. The fluid hose of claim 16, wherein the density of the outer layer is less than the density of the geometric segments.

* * * * *